(12) United States Patent
Imbert

(10) Patent No.: US 7,686,728 B2
(45) Date of Patent: Mar. 30, 2010

(54) MECHANICAL ADAPTER ASSEMBLY

(75) Inventor: Frédéri Imbert, Lyons (FR)

(73) Assignee: Renault Trucks, Saint Priest (FR)

( * ) Notice: Subject to any disclaimer, the term of this patent is extended or adjusted under 35 U.S.C. 154(b) by 0 days.

(21) Appl. No.: 11/498,312

(22) Filed: Aug. 2, 2006

(65) Prior Publication Data

US 2007/0004262 A1 Jan. 4, 2007

Related U.S. Application Data

(63) Continuation of application No. PCT/FR2005/050121, filed on Feb. 23, 2005.

(30) Foreign Application Priority Data

Feb. 24, 2004 (FR) .................................... 04 50341

(51) Int. Cl.
*F16H 57/04* (2006.01)

(52) U.S. Cl. ........................ 475/160; 475/201; 475/221; 184/6.12

(58) Field of Classification Search ................ 475/160, 475/201, 230; 184/6.12
See application file for complete search history.

(56) References Cited

U.S. PATENT DOCUMENTS

| | | | |
|---|---|---|---|
| 3,550,724 A | 12/1970 | Vollmer | |
| 3,719,253 A | 3/1973 | Dukes et al. | |
| 3,738,452 A * | 6/1973 | Hausinger | 184/6.12 |
| 4,352,301 A * | 10/1982 | Fleury | 74/467 |
| 5,404,963 A * | 4/1995 | Crepas et al. | 184/6.12 |
| 5,567,306 A * | 10/1996 | DeWachter | 210/167.02 |
| 5,584,773 A | 12/1996 | Kershaw et al. | |
| 6,502,665 B1 * | 1/2003 | Brehob | 184/6.12 |
| 6,648,788 B1 * | 11/2003 | Sullivan | 475/221 |
| 7,093,681 B2 * | 8/2006 | Strain | 180/14.2 |
| 7,192,376 B2 * | 3/2007 | Ishii et al. | 475/231 |

FOREIGN PATENT DOCUMENTS

EP 0 599 050 A1 6/1994

* cited by examiner

*Primary Examiner*—David D Le
*Assistant Examiner*—Derek D Knight
(74) *Attorney, Agent, or Firm*—Burr & Brown

(57) ABSTRACT

The invention relates to the mechanical adapter assembly of the transmission line for a motor vehicle. The mechanical adapter includes shafts rotatably guided by different bearings and couplings for driving said different shafts. The mechanical adapter also includes a differential carrier, which is used in the form of a crankcase containing the oil for lubricating the different bearings and couplings and provided with a front aperture. A front plate integrates a pump and makes it possible to close said front aperture of the differential support. Additionally, an attached pipe section supplies the oil from said front plate to the differential support and interacts with additional fixtures to the front plate and the differential carrier.

15 Claims, 4 Drawing Sheets

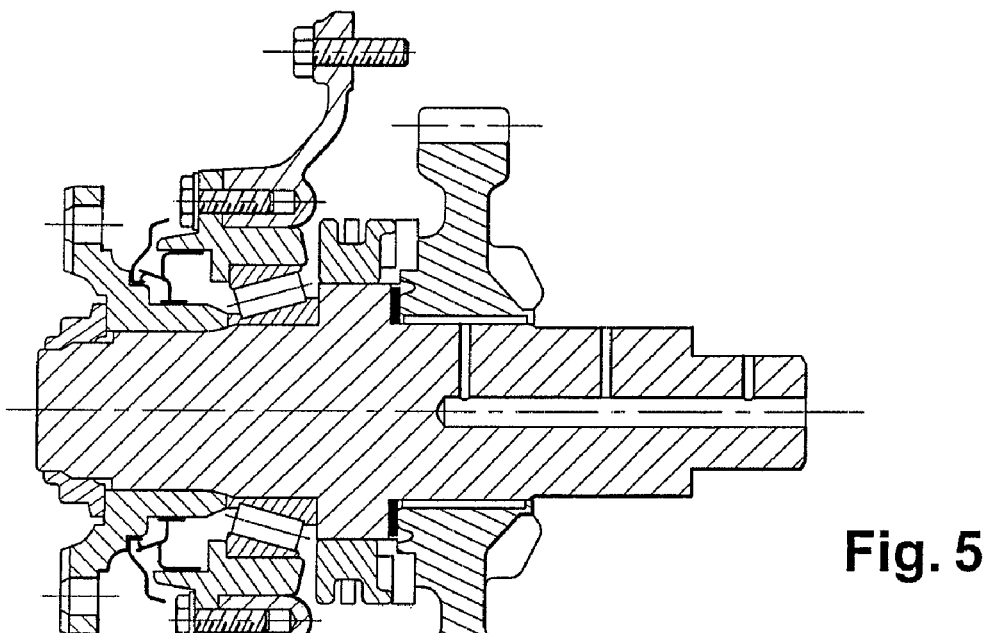
Fig. 5
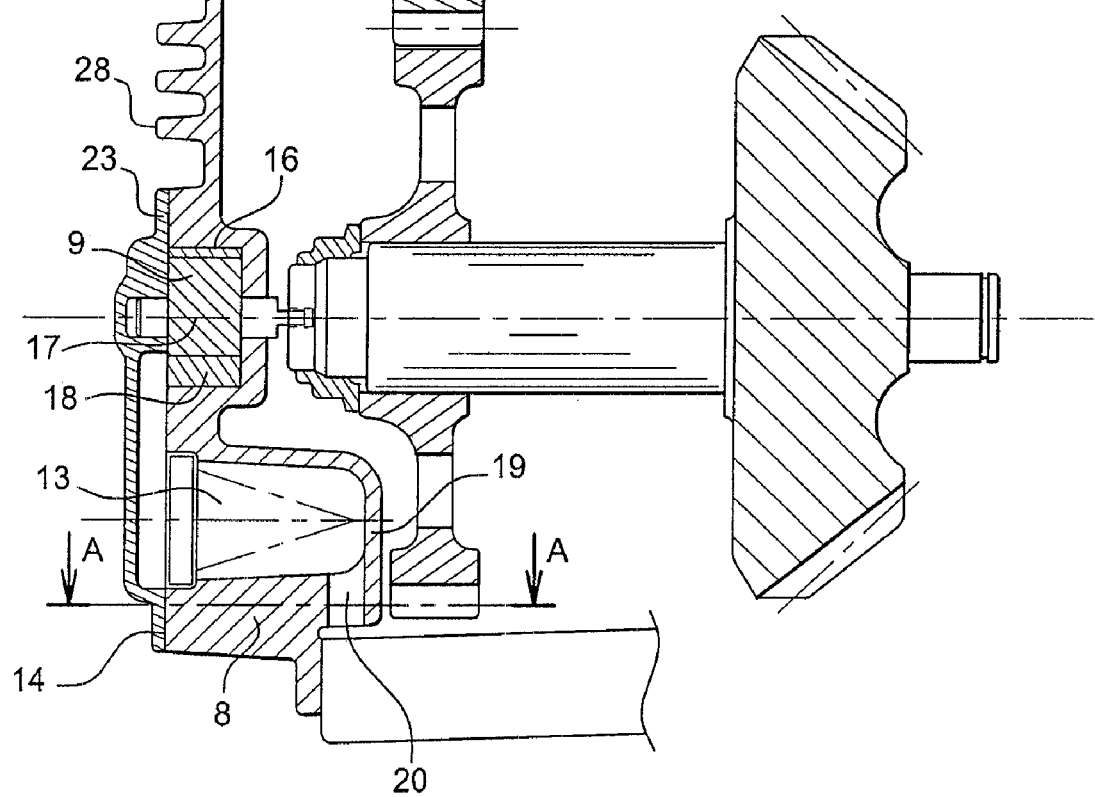
Fig. 6
(A-A)
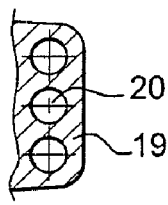

MECHANICAL ADAPTER ASSEMBLY

FIELD OF THE INVENTION

The invention relates to a transmission component for a motor vehicle, especially a vehicle comprising several powered axles such as a lorry or a construction site vehicle. The transmission line of such vehicles comprises a mechanical adapter assembly making it possible to rotatably guide several transmission shafts and also to distribute the engine torque to the axles and the wheels.

The invention refers more especially to a mechanical adapter assembly the main housing of which is obtained through a coreless moulding process so as to allow so-called "natural" removal from the mould.

DESCRIPTION OF THE PRIOR ART

Generally speaking, the mechanical adapter assemblies fitted in the transmission line of a motor vehicle comprise a main crankcase, also referred to as a differential carrier, which is obtained through a sand moulding process and requires the use of several cores in order to achieve the complex shapes that are sought after.

However, the use of cores requires a shot blasting operation in order to remove grains of sand that remain stuck to the walls of the crankcases. In this case, it is possible that grains of sand located in inaccessible areas remain stuck to the walls even when the mechanical adapter assembly is assembled. Thus, during operation of the transmission line, the oil that flows inside the crankcase may release these grains of sand which then form foreign matter that has a harmful effect on satisfactory performance of lubrication of rotating parts over time. It then becomes necessary to perform maintenance operations such as regularly draining the mechanical adapter assembly in order to evacuate this foreign matter. Such maintenance operations are expensive because they render a vehicle unusable for several hours.

Thus, the object of the invention is to reduce or even eliminate foreign matter originating from the fabrication of the components that constitute a mechanical adapter assembly with a view to eliminating any maintenance operation.

BACKGROUND OF THE INVENTION

The invention therefore relates to a mechanical adapter assembly of a transmission line for a motor vehicle comprising shafts rotatably guided by various bearings and couplings for driving said various shafts.

It is characterised in that it also comprises:
- a differential carrier which is used as a crankcase containing the oil for lubricating the various bearings and couplings, the differential carrier comprising a front aperture;
- a front plate integrating a pump and making it possible to close the front aperture of the differential carrier;
- an attached pipe section used to supply oil from the front aperture to the differential carrier, the pipe section cooperating with additional fixtures on firstly the front plate and secondly the differential carrier.

In other words, the mechanical adapter assembly comprises a crankcase which is open on at least one of its surfaces. This configuration makes it possible to avoid using a core and therefore facilitates cleaning and ensures that components are clean prior to being assembled.

This mechanical adapter assembly thus comprises a front plate making it possible to close the aperture of the differential carrier and also to integrate an oil pump that is rotatably driven by one of the rotating shafts inside the mechanical adapter assembly.

It also comprises an attached pipe section which also makes it possible to avoid using cores when designing the mechanical adapter assembly. This pipe section is used to supply oil inside the differential carrier from the lower part to a rear area of the differential carrier in order to lubricate the various rotating components and couplings.

Advantageously, the front plate may comprise an oil filter. In other words, when the front plate is disassembled from the differential carrier, an oil filter remains attached to the front plate and can be changed if necessary.

In practice, this oil filter may be demountable from a front surface of the front plate facing towards the outside of a mechanical adapter assembly. In other words, in this case, it is not necessary to disassemble the front plate in order to change the oil filter. This configuration is also highly attractive because it makes it possible to reduce the costs incurred by maintenance operations considerably.

In practice, the pump may be separately mounted on a surface of the front plate facing towards the inside of the mechanical adapter assembly. Thus, it is necessary to disassemble the front plate from the differential carrier in order to access the pump in order to change it or simply maintain it.

Advantageously, the pump may comprise a rotor and a stator fitted in a housing. In this case, the housing formed in the front plate acts as the case of the pump which is built when the rotor and the stator are assembled. This type of assembly avoids the use of a pre-assembled pump that forms an independent separately mounted component in the mechanical adapter assembly.

In practice, the front plate may comprise an intake area, the suction passage of which points downwards and emerges close to the bottom of the differential carrier.

In other words, a passage is used to aspirate oil which is fed into the bottom of the differential carrier by gravity. This passage emerges towards the bottom and thus has openings, the axes of revolution of which are substantially vertical. In this way, aspiration takes place as close as possible to the bottom of the differential carrier in order not to aspirate air when, in particular, the rotation speed of the various components is high.

In fact, when the rotation speed of the various components inside the mechanical adapter assembly is high, these components then constantly agitate the oil and, consequently, only a small quantity of oil remains permanently on the bottom of the mechanical adapter assembly.

The mechanical adapter assembly may comprise a system for locking the inter-axle differential. In this case the front plate may then comprise a power cylinder capable of ensuring locking of the inter-axle differential and consequently synchronising the shafts that are linked by the inter-axle differential.

In other words, in certain special cases, it is necessary to propel the vehicle by means of two synchronised powered axles. In this case, one of the shafts inside the mechanical adapter assembly is driven directly by the engine torque of the vehicle. This function is obtained by means of a power cylinder that controls the displacement of a jaw clutch which couples the differential side gear to one of the transmission output shafts of the mechanical adapter assembly.

Advantageously and in certain cases, the front plate may comprise a heat exchanger. In fact, in order to improve cooling of the oil inside the mechanical adapter assembly, it is useful to equip the front plate with a certain number of fins that act as a heat exchanger.

According to another embodiment, the front plate may comprise openings making it possible to evacuate oil and cool it in an independent heat exchanger. In this case, a certain number of hoses are used to connect the openings located on the front plate to the independent heat exchanger. This configuration makes it possible, in particular, to locate the heat exchanger in an area that is better ventilated or less exposed to soiling.

In practice, the front plate may be obtained by using a coreless moulding process. In this way, it is possible to clean every area of the part, making sure that not a single grain of sand is left behind.

In this case, a cover may be separately mounted on the front plate in order to ensure that oil is distributed to those areas that require extra oil for satisfactory lubrication. Thus, the front plate comprises an opening making it possible to provide maintenance access to the mechanical adapter assembly, this opening being closed by a cover.

Advantageously, the distinctive pipe section may comprise at least one opening making it possible to precisely lubricate a given area of the mechanical adapter assembly.

In other words, the pipe section may have a plurality of drilled holes that may or may not be fitted with nozzles or hoses making it possible to lubricate a predetermined area inside the mechanical adapter assembly. Thus the pipe section may act as a main conduit comprising several branches in order to ensure extremely precise lubrication of the various components of the mechanical adapter assembly. These various components include, in particular, the sprockets of the mechanical adapter assembly, the inter-axle differential and beatings such as the ball bearings that rotatably guide the various shafts.

BRIEF DESCRIPTION OF THE DRAWINGS

The manner in which the invention is implemented and the resulting advantages will become more apparent from the description of the following embodiment, given merely by way of example, reference being made to the accompanying drawings in which:

FIG. 5 is a partial longitudinal cross-sectional view of a mechanical adapter assembly in accordance with the invention;

FIG. 6 is a partial cross-sectional view of the suction intake area of the front plate in accordance with the invention;

DESCRIPTION OF THE PREFERRED EMBODIMENTS

As stated earlier, the invention relates to a mechanical adapter assembly of a transmission line for a motor vehicle comprising shafts rotatably guided by various bearings and couplings for driving the various shafts.

Figure 1:
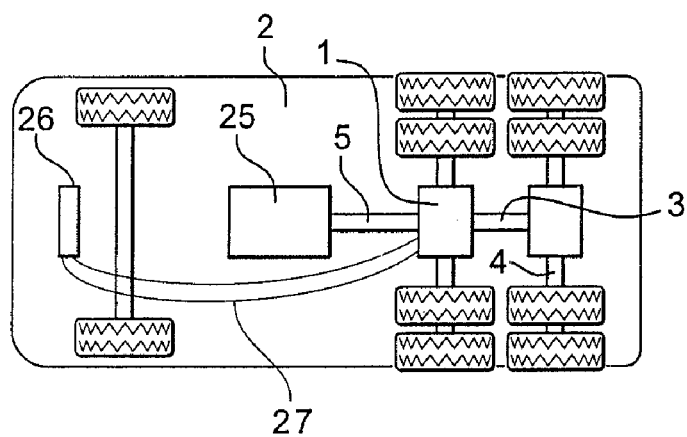
FIG. 1 is a bottom view of a motor vehicle comprising a mechanical adapter assembly in accordance with the invention.

As shown in FIG. 1, a motor vehicle (2) comprises an engine assembly (25) that drives a shaft (5). This shaft (5) enters the mechanical adapter assembly (1) and drives, in particular, output shaft (3) linked to the rear axle. Depending on the load and/or road conditions, it may or may not be necessary to drive shafts (3) and (5) synchronously and, consequently, to transmit the same engine torque to both axles (4).

Figure 2:
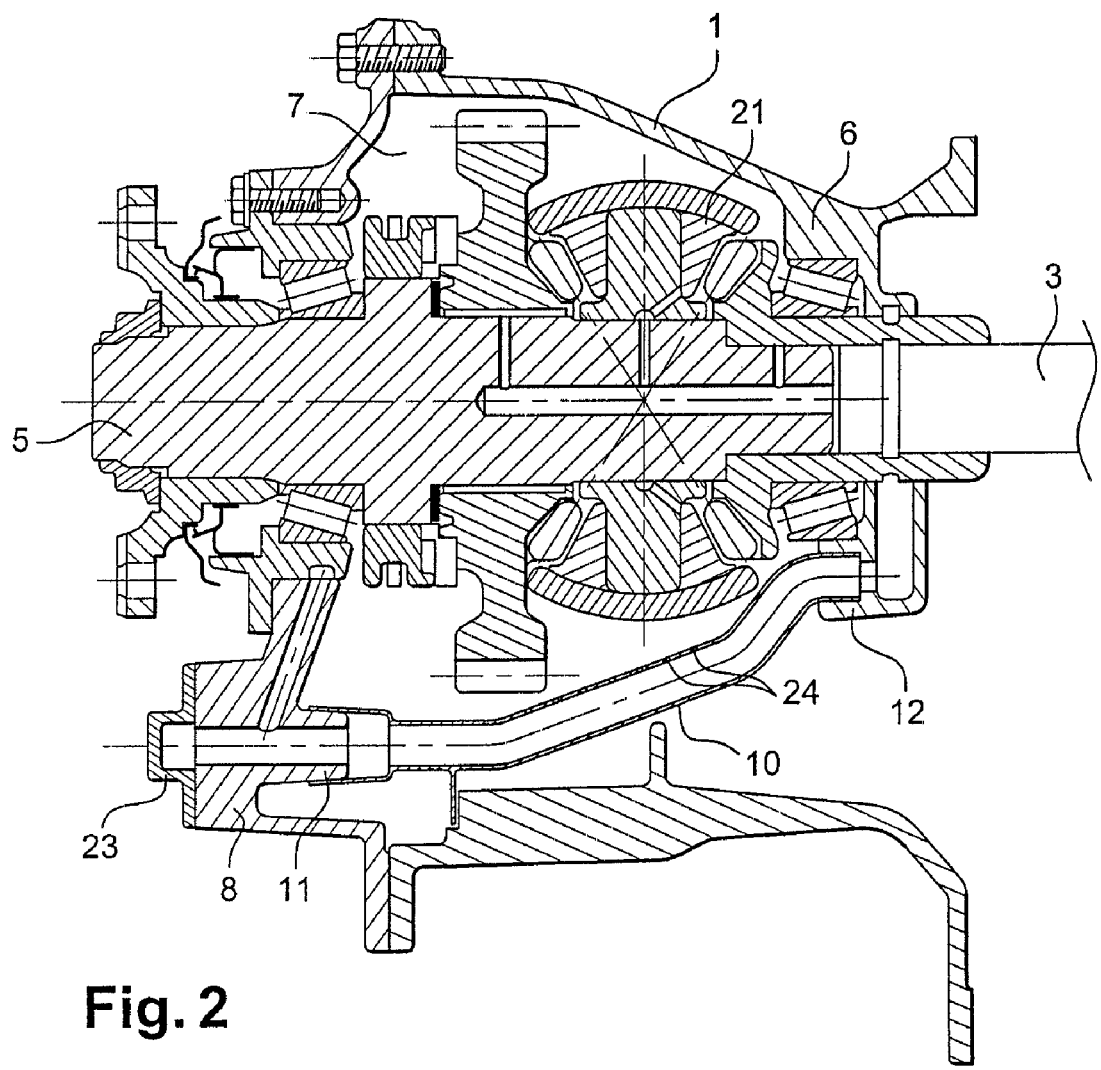
FIG. 2 is a longitudinal cross-section of a mechanical adapter assembly in accordance with the invention.

As shown in FIG. 2, shafts (3) and (5) are linked together by means of an inter-axle differential (21). According to the invention, the mechanical adapter assembly comprises a differential carrier (6) acting as a crankcase and comprising a front aperture (7). This aperture (7) is closed by means of a front plate (8) which integrates, in particular, an oil pump. The mechanical adapter assembly (1) also comprises an attached pipe section (10) which is used to supply oil from the front plate (8) to the differential carrier (6). Each of the ends of pipe section (10) coincides with a matching fixture (11, 12).

In the embodiment shown, a plurality of openings (24) are made in pipe section (10) in order to lubricate particular areas inside the mechanical adapter assembly (1).

Figure 3:
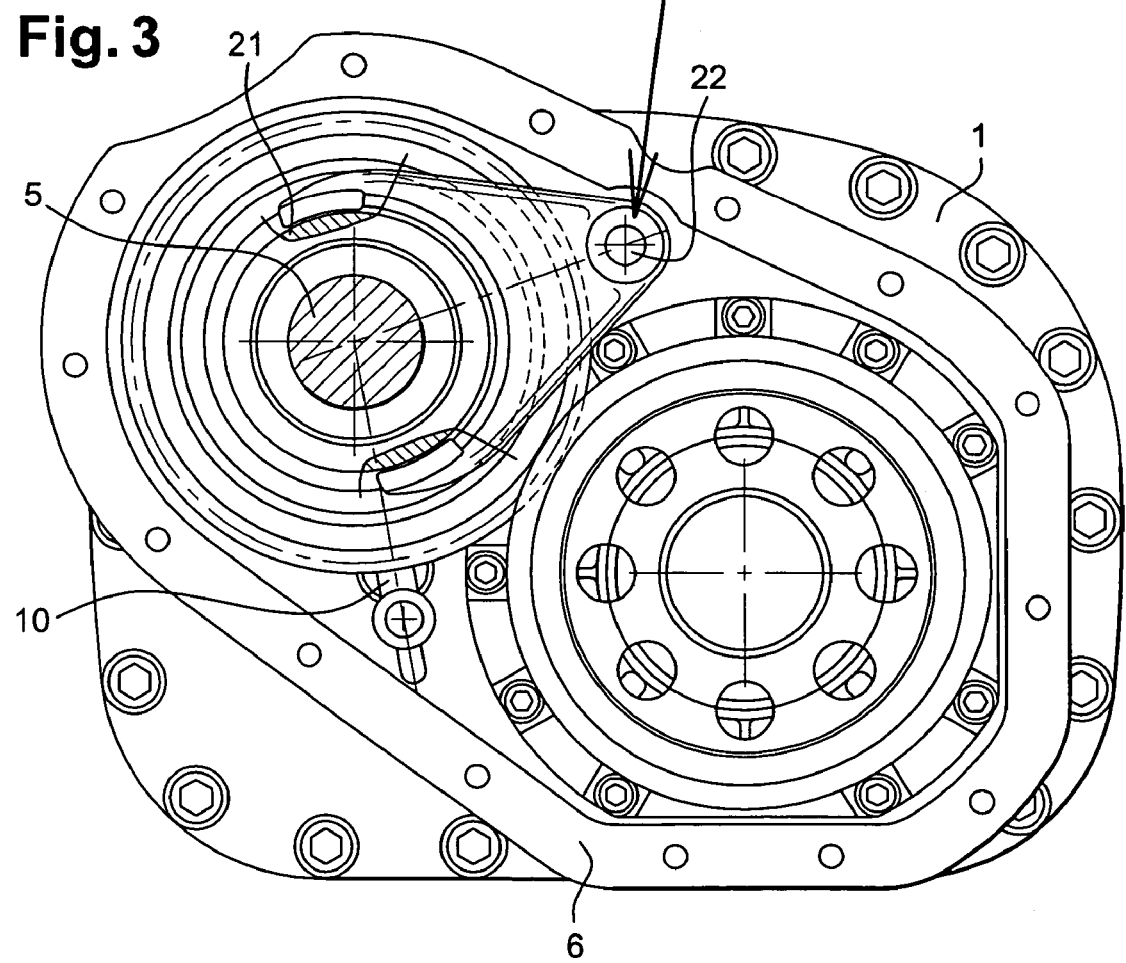
FIG. 3 is a left-hand side view of the mechanical adapter assembly in accordance with the invention.

As shown in FIG. 3, the mechanical adapter assembly comprises a power cylinder (22) used to control locking of the inter-axle differential (21). It is used to move a jaw clutch in order to allow shaft (3) to be driven directly by engine shaft (5).

Figure 4:
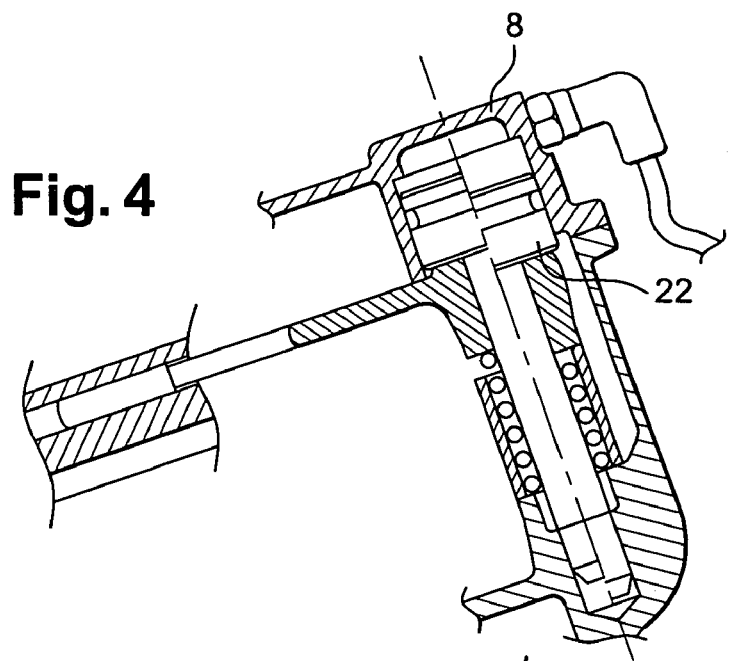
FIG. 4 is a cross-sectional view of a power cylinder that controls the inter-axle differential in accordance with the invention.

Advantageously and as shown in FIG. 4, power cylinder (22) may be separately mounted inside front plate (8). In this illustration, power cylinder (22) is pneumatic but it may also be powered by a different energy, especially electrically or hydraulically.

As shown in FIG. 5, the front plate (8) may comprise a housing (16) in which a pump (9) is mounted. The shaft of the pump may then be rotatably driven by one of the rotating shafts of the mechanical adapter assembly (1).

In this case, the pump (9) used is of a specific type because it is a dedicated pump for this application and comprises a rotor (17) that spins inside a stator (18).

In this illustration, the pump (9) is mounted on the outer surface (14) of front plate (8). In this way, a cover (23) ensures closing of front plate (8) and sealing on this outer surface (14) and also ensures distribution of oil or of any lubricant.

According to one particular embodiment, the front plate (8) may also comprise an oil filter (13). In the illustration shown in this Figure, this oil filter (13) is also mounted on the outer surface (14) of the front plate (8). In this way, it can also be changed easily by opening cover (23).

The front plate (8) also comprises an oil intake area (19) and has a certain number of openings (20) located as close as possible to the bottom of the mechanical adapter assembly (1).

The front plate (8) also may comprise a number of fins (28) that act as a heat exchanger. The fins (28) may be used to improve cooling of the oil inside the mechanical adapter assembly (1). The fins (28) may be arranged at any location along the front plate (8) as is well known in the art.

As shown in FIG. 6, the intake area (19) may comprise, for example, three openings (20) of circular cross-section but the openings may also have any geometry, including an as-cast geometry and therefore be obtained directly by moulding. This prevents cavitation phenomena caused by aspirated air, even at high rotation speeds.

Additional openings (not shown) may be provided in the front plate making it possible to evacuate oil and cool it in an independent heat exchanger (26), as shown in FIG. 1. Hoses (27), also shown in FIG. 1 are used to connect the openings located in the front plate (8) to the independent heat exchanger (26). This configuration makes it possible, in particular, to locate the heat exchanger (26) in an area that is better ventilated or less exposed to soiling. The additional holes can be located in a pressurized supply path or a suction supply path as would be well known in the art.

Figure 7:
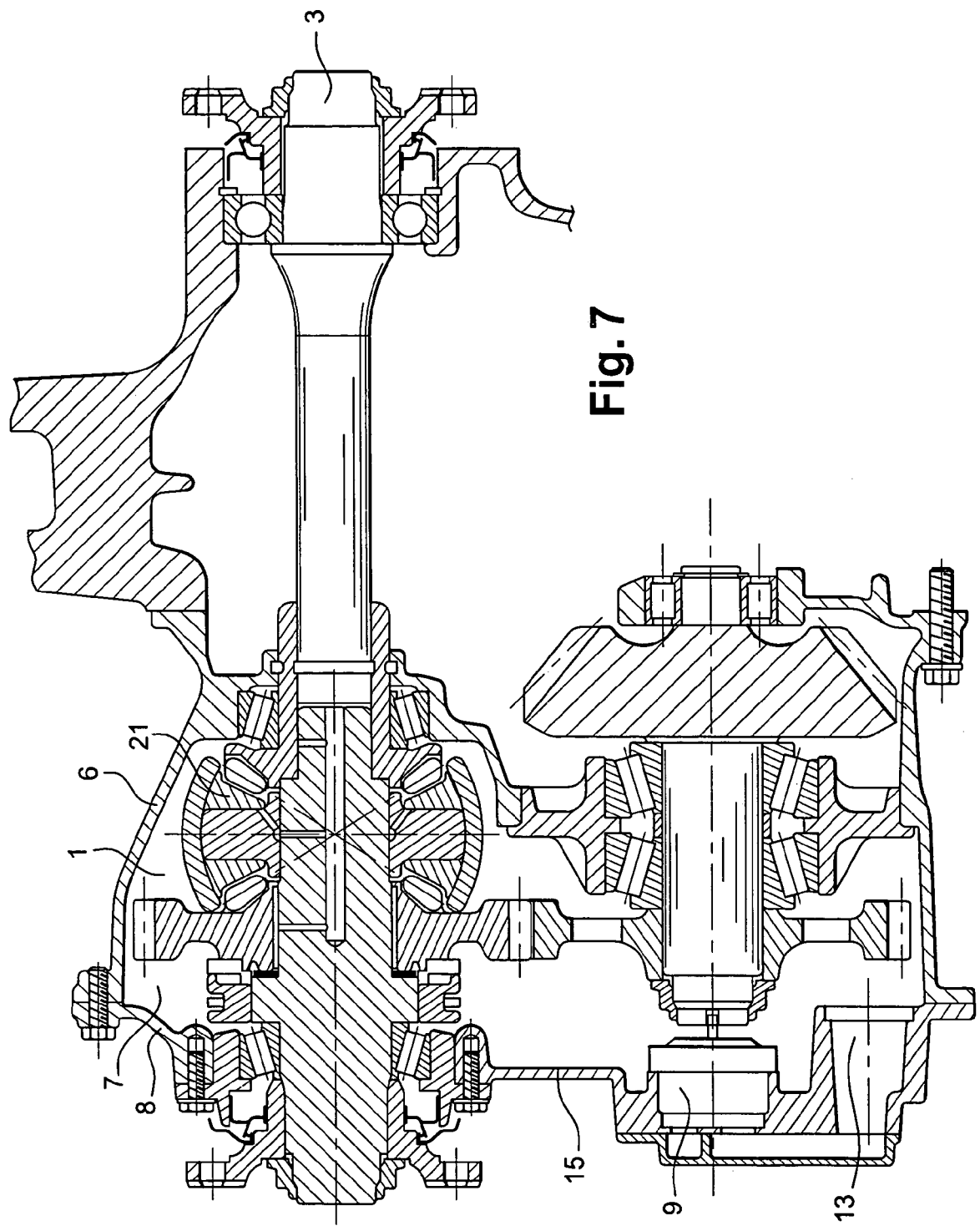
FIG. 7 is a partial longitudinal cross-sectional view of the mechanical adapter assembly in accordance with the invention.

As shown in FIG. 7, it is also possible to mount pump (9) on the inner surface (15) of front plate (8). In this view, oil pump (9) is a commercially available one-piece unit. Similarly, an oil filter (13) is mounted on inner surface (15) of front plate (8).

For both these components, it is necessary to disassemble the front plate (8) in order to allow their replacement or, more generally, maintenance.

The preceding description demonstrates that a mechanical adapter assembly in accordance with the invention has many advantages, in particular:
- total cleanliness of its components is guaranteed because the use of cores is avoided for the differential carrier and the front plate;
- it makes it possible to reduce or even eliminate maintenance operations;
- it makes it possible to facilitate assembly and maintenance operations and to optimise the assembly process during production.

The invention claimed is:

1. A mechanical adapter assembly of a transmission line for a motor vehicle comprising:
   shafts rotatably guided by various bearings;
   couplings for driving various shafts;
   a differential carrier defining a crankcase, which is used to contain an oil for lubricating the various bearings and couplings, said differential carrier comprising a front aperture;
   an inter-axle differential;
   a front plate integrating a pump and making it possible to close said front aperture of the differential carrier, wherein said front plate comprises a power cylinder capable of ensuring locking of the inter-axle differential; and
   an attached internal pipe section having a first open end and an opposite second open end, said internal pipe section being used to supply oil from the front plate to the differential carrier, said attached internal pipe section terminating at said first open end thereof in a first fixture on the front plate, extending through the crankcase and terminating at said second open end thereof in a fixture on the differential carrier,
   wherein said attached internal pipe section comprises a plurality of openings in a side-wall thereof, the openings being positioned so as to direct a spray of lubricating oil on at least one of a sprocket, the inter-axle differential, and a bearing.

2. A mechanical adapter assembly as claimed in claim 1, wherein said front plate comprises an intake area wherein the suction passage of said intake area points downwards and emerges close to the bottom of said differential carrier.

3. A mechanical adapter assembly as claimed in claim 1, wherein said front plate comprises a heat exchanger.

4. A mechanical adapter assembly as claimed in claim 1, wherein said front plate comprises openings making it possible to evacuate oil and cool it in an independent heat exchanger.

5. A mechanical adapter assembly as claimed in claim 1, wherein the first fixture on the front plate is formed as part of the front plate.

6. A mechanical adapter assembly as claimed in claim 1, wherein said front plate comprises an oil filter.

7. A mechanical adapter assembly as claimed in claim 6, wherein said oil filter is demountable from a surface of said front plate facing towards the outside of the mechanical adapter assembly.

8. A mechanical adapter assembly as claimed in claim 1, wherein said pump is mounted on a surface of said front plate facing towards the inside of mechanical adapter assembly.

9. A mechanical adapter assembly as claimed in claim 8, wherein said pump comprises a rotor and a stator fitted in a housing.

10. A mechanical adapter assembly as claimed in claim 1, wherein said front plate is obtained by using a coreless moulding process.

11. A mechanical adapter assembly as claimed in claim 10, wherein a cover is fitted on said front plate to ensure distribution of oil to those areas that require extra oil for satisfactory lubrication.

12. A mechanical adapter assembly of a transmission line for a motor vehicle comprising:
   shafts rotatably guided by various bearings;
   couplings for driving various shafts;
   a differential carrier defining a crankcase, which is used to contain an oil for lubricating the various bearings and couplings, said differential carrier comprising a front aperture;
   an inter-axle differential;
   a front plate integrating a pump and making it possible to close said front aperture of the differential carrier, wherein said front plate comprises a power cylinder capable of ensuring locking of the inter-axle differential; and
   an attached internal pipe section having a first open end and an opposite, second open end, said internal pipe section being used to supply oil from the front plate to the differential carrier, said attached internal pipe section terminating at said first open end thereof in a first fixture on the front plate, extending through the crankcase and terminating at said second open end thereof in a fixture on the differential carrier,
   wherein the attached internal pipe section comprises a plurality of openings in a side-wall thereof, the openings being positioned so as to direct a spray of lubricating oil on at least one of various components and couplings of the mechanical adapter assembly that are rotatable in relation to the differential carrier.

13. A mechanical adapter assembly as claimed in claim 12, wherein said various components comprise a sprocket, the inter-axle differential, and the various bearings.

14. A mechanical adapter assembly as claimed in claim 12, wherein the first fixture on the front plate is formed as part of the front plate.

15. A mechanical adapter assembly of a transmission line for a motor vehicle comprising:
   shafts rotatably guided by various bearings;
   couplings for driving various shafts;
   a differential carrier defining a crankcase, which contains oil for lubricating the various bearings and couplings, said differential carrier comprising a front aperture;
   an inter-axle differential;
   a front plate integrating a pump and closing said front aperture of the differential carrier, wherein said front plate comprises a power cylinder capable of ensuring locking of the inter-axle differential; and
   an attached internal pipe section used to supply oil from the front plate to the differential carrier, said pipe section cooperating with matching fixtures firstly on the front plate and secondly on the differential carrier.

* * * * *